(12) United States Patent
Park et al.

(10) Patent No.: US 9,262,096 B2
(45) Date of Patent: Feb. 16, 2016

(54) DYNAMIC ADDRESS MAPPING FOR FINISH IN THE FIELD

(71) Applicant: Seagate Technology LLC, Cupertino, CA (US)

(72) Inventors: Bumseok Park, Gyeonggi-Do (KR); Gyutaek Kim, Gyeonggi-Do (KR); Woosik Kim, Gyeonggi-Do (KR)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 333 days.

(21) Appl. No.: 13/942,516

(22) Filed: Jul. 15, 2013

(65) Prior Publication Data

US 2015/0019830 A1 Jan. 15, 2015

(51) Int. Cl.
*G06F 3/06* (2006.01)

(52) U.S. Cl.
CPC ............ *G06F 3/0659* (2013.01); *G06F 3/0604* (2013.01); *G06F 3/064* (2013.01); *G06F 3/0673* (2013.01)

(58) Field of Classification Search
CPC ..... G06F 3/0659; G06F 3/0604; G06F 3/064; G06F 3/0673
USPC ................ 711/112, 154, 165, 166; 369/53.41
See application file for complete search history.

(56) References Cited

U.S. PATENT DOCUMENTS

| | | | | |
|---|---|---|---|---|
| 6,412,089 | B1 * | 6/2002 | Lenny et al. | 714/769 |
| 6,614,934 | B1 * | 9/2003 | Wu et al. | 382/232 |
| 7,234,036 | B1 * | 6/2007 | Chang et al. | 711/202 |
| 7,904,635 | B2 * | 3/2011 | Deng et al. | 711/103 |
| 8,205,063 | B2 | 6/2012 | Sinclair | |
| 8,749,905 | B1 * | 6/2014 | Malina | 360/31 |
| 2013/0142024 | A1 | 6/2013 | Sanvido et al. | |

* cited by examiner

*Primary Examiner* — Stephen Elmore
(74) *Attorney, Agent, or Firm* — HolzerIPLaw, PC (57) ABSTRACT

Implementations disclosed herein provide for dynamically mapping logical block addresses (LBA) of unfinished data blocks to unused data blocks during an in-the-field finishing process of a storage medium. Such dynamic mapping creates an impression that the storage medium operates at an advertised capacity before the effective capacity is equal to the advertised capacity.

18 Claims, 5 Drawing Sheets

DYNAMIC ADDRESS MAPPING FOR FINISH IN THE FIELD

BACKGROUND

A series of "finishing processes" may be executed to logically define boundaries of data blocks of a storage medium and to associate the data blocks with corresponding logical addresses. Executing such finishing processes on an individual storage medium can take several hours. Therefore, manufacturing costs could be reduced by "finishing" a storage medium while the storage medium is in possession of an end user (i.e., "in the field"), rather than at a factory. However, a storage medium cannot operate to a full, advertised capacity until such finishing processes are fully executed. Therefore, finishing a storage medium in the field inconveniences the end user by denying the end user access to unfinished locations on the storage medium while the finishing processes execute.

SUMMARY

Implementations described and claimed herein provide for receiving an access command to a target logical address corresponding to an unfinished target data block on a storage medium and executing the access command on a finished and unused data block on the storage medium.

This Summary is provided to introduce an election of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various implementations and implementations as further illustrated in the accompanying drawings and defined in the appended claims.

DETAILED DESCRIPTION

Figure 1:
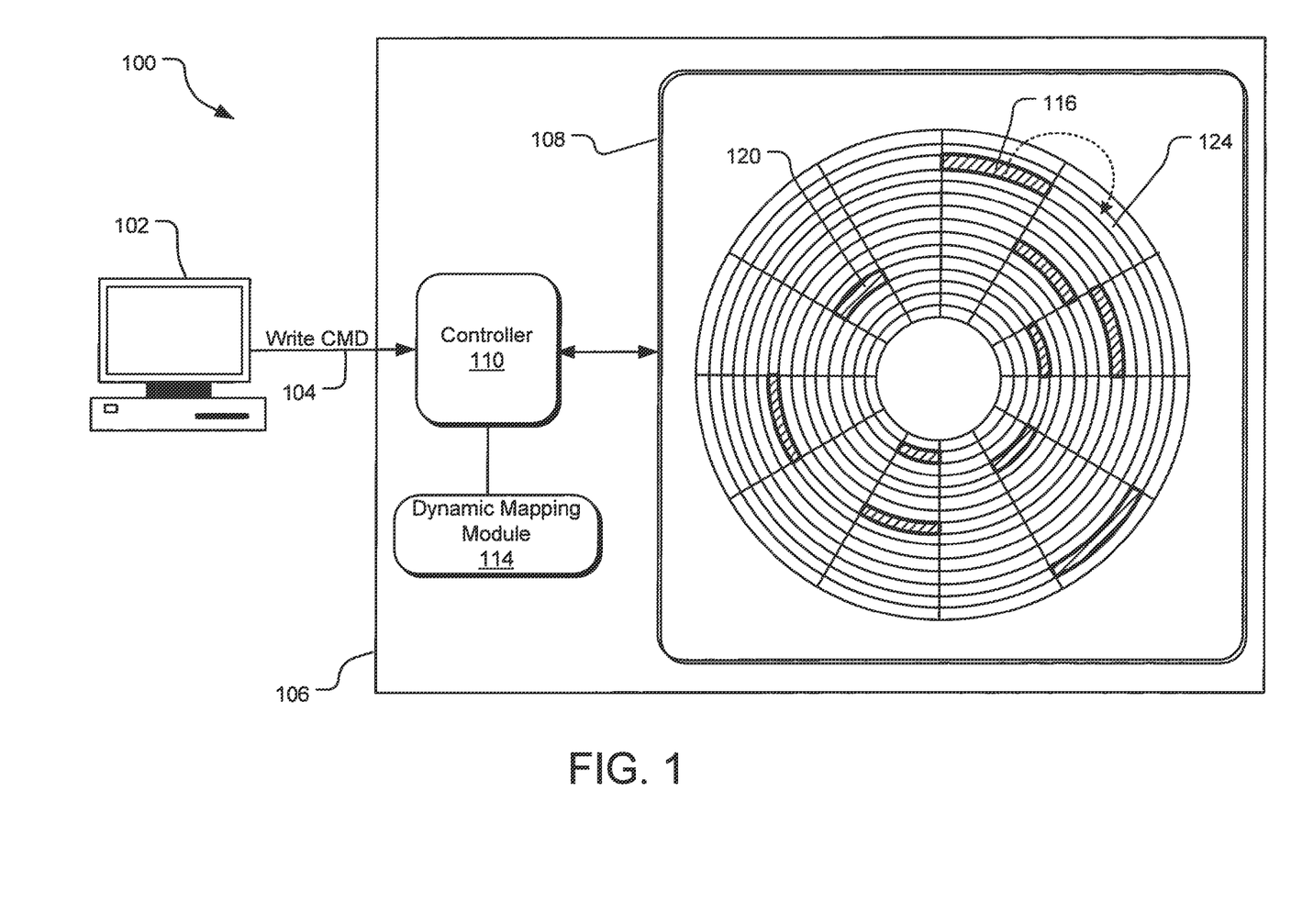
FIG. 1 illustrates an example logical block address (LBA) dynamic mapping system suitable for implementing an in-the-field finishing process.

FIG. 1 illustrates an example logical block address (LBA) dynamic mapping system 100 suitable for implementing an in-the-field finishing process. The system 100 includes a host computer 102 that sends one or access commands (e.g., a write command 104) to a storage device 106. The storage device 106 is a device having a tangible computer-readable storage medium (i.e., the storage medium 108), which can store data in units (e.g., cells or data blocks) that are accessible by a computer. Such tangible computer-readable media is not embodied in a carrier-wave or other signal but may include without limitation magnetic storage disks, solid state drives, flash memory, optical storage disks, random access memories (RAMs), read only memories (ROMS) and the like. The storage device 106 includes a number of data blocks (e.g., data sectors on a disk), which can hold a set number of storage bytes.

Before a storage device is fully operational, a series of "finishing processes" are performed to make data blocks of the storage device usable for data storage. Finishing processes include, for example, defect scanning processes, defect management processes, and data block layout processes. Data block layout processes (e.g., sector layout processes) are processes that logically define boundaries between physical data storage locations on a storage medium and/or associate physical storage locations on the storage medium with corresponding logical address locations. During an example finishing process, data block numbers (e.g., sector numbers) are logically assigned to groupings of data cells on the storage medium. During another example finishing process, logical addresses (e.g., LBAs) are associated with the data blocks.

"Finishing" a data block includes executing at least one data block layout process on a data block, and may also include one or more defect scanning or management processes. As used herein, a data block on a medium is "unfinished" when at least one data block layout process has not fully executed on the data block. A data block on a medium is considered "finished" when the data block has undergone all requisite finishing processes (e.g., data block layout processes, defect scanning processes, and defect management processes).

An entire storage medium is "finished" when all usable data blocks (e.g., data blocks assigned for read/write data storage) have been finished and the storage medium has an effective storage capacity equal to a storage capacity advertised to consumers (i.e., the advertised storage capacity).

Finishing processes are distinct from formatting processes. Formatting processes include, for example, encoding sector marks and cyclic redundancy check (CRC) data in each data block, partitioning the medium into one or more regions, and creating the file system format and data structures. According to various implementations of the disclosed technology, formatting processes may execute concurrently with finishing processes or after the finishing processes have fully executed.

The above-described finishing processes can take several (e.g., 10-20) hours to execute on an individual storage medium. Therefore, production costs are significantly reduced when storage media are "finished in the field" (e.g., while in possession of an end user) rather than at a factory (e.g., during commissioning of the drive). In-the-field finishing processes may execute automatically, such as when a user (not shown) first connects the storage device 106 to the host 102, or in response to one or more user-initiated commands. While such finishing processes execute on one or more unfinished data blocks, a user may be able to access (e.g., read or write to) other, finished data blocks on the storage medium 108. However, the storage medium 108 does not have an effective storage capacity equal to the full, advertised storage capacity until the finishing processes are fully executed on all data blocks that can store data (e.g., excluding defective blocks) on the storage medium 108.

If the user attempts to access an unfinished portion of the storage medium 108, an error may result. Therefore, one challenge in implementing in-the-field finishing processes is instructing the storage device 106 to read and write data during the execution of such finishing processes in a manner such that it appears, from the user's perspective, that the storage drive 106 operates to its full, advertised storage capacity. The system 100 addresses such challenges by including a mechanism (i.e., a dynamic mapping module 114) that allows a user to send access commands (e.g., read or write commands) corresponding to unfinished data blocks without receiving errors. In this respect, the storage medium 108 appears to operate at a full, advertised capacity even before all data blocks on the storage medium 108 are finished.

In FIG. 1, the storage medium 108 has been partially finished at the factory. For example, the medium 108 may have an actual (e.g., currently effective) capacity of 600 GB and an advertised capacity of 1 TB. Example unfinished data blocks are shown with hatching (e.g., an unfinished sector 120). While a user readily uses the storage device 106 (e.g., reads and writes data to the storage medium 108), one or more finishing processes execute in the background to finish the remaining 400 GB on the medium 108 (e.g., unfinished sectors such as the sector 120).

The host 102 can send access commands (e.g., read or write commands) to the storage device 106. With each access command, the operating system of the host computer 102 specifies a target logical block address (LBA) indicating where the command is to be executed on the storage medium 108. Each target LBA corresponds, via a static mapping scheme, to a target data block (e.g., a target sector) on the storage medium 108.

In FIG. 1, the host 102 sends a write command 104 to instruct the storage device 106 to write data to a target LBA. The command is received by a controller 110, which may be, for example, a processor within or communicatively coupled to the storage device 106. The controller 110 receives the write command 104 and determines that the target LBA corresponds, via the static mapping scheme, to a target data block 116. The controller 110 also determines that the targeted data block 116 is not yet finished.

Responsive to the determination that the target data block 116 is not yet finished, the controller 110 identifies an unused data block 124 (e.g., an unused sector) on the medium 108. As used herein, the term "unused data block" refers to a finished data block that is designated for read/write purposes (e.g., mapped to a corresponding LBA) and is not currently being used to store data. Each unused data block corresponds, via a static mapping scheme, to an "unused LBA."

The controller 110 includes a dynamic mapping module 114 that dynamically maps the target LBA to the identified unused data block 124. The controller 110 then executes the write command 104 on the identified unused data block 124 rather than the target data block 116. Consequently, the user can read and write data associated with the unfinished, target data block 116 (e.g., by accessing the identified unused data block 124) without receiving error messages warning, for example, that the target data block 116 cannot be found. From the user's perspective, the storage device 106 operates as though it has an effective capacity equal to the advertised capacity (e.g., 1 TB).

In the above-described manner, logical addresses of unfinished data blocks are dynamically mapped to unused data blocks so that the user can read and write to the storage device 106 without being inconvenienced by the fact that some data blocks are unfinished.

In one implementation, the above-described dynamic mapping of each unfinished data block is "undone" in a reverse-mapping process when the storage medium is finished. For example, data written to the unused data block 124 can be rewritten and remapped, in a reverse-mapping process, to the original target data block 116 after the target data block 116 has finished. During such reverse-mapping process, one or more dynamic mapping tables may be dynamically updated to indicate that the target LBA is once again associated with (e.g., mapped to) the target data block 116. Tables including dynamic mapping information may be discarded when the reverse-mapping process is complete for all data blocks on the storage medium 108.

Figure 2:
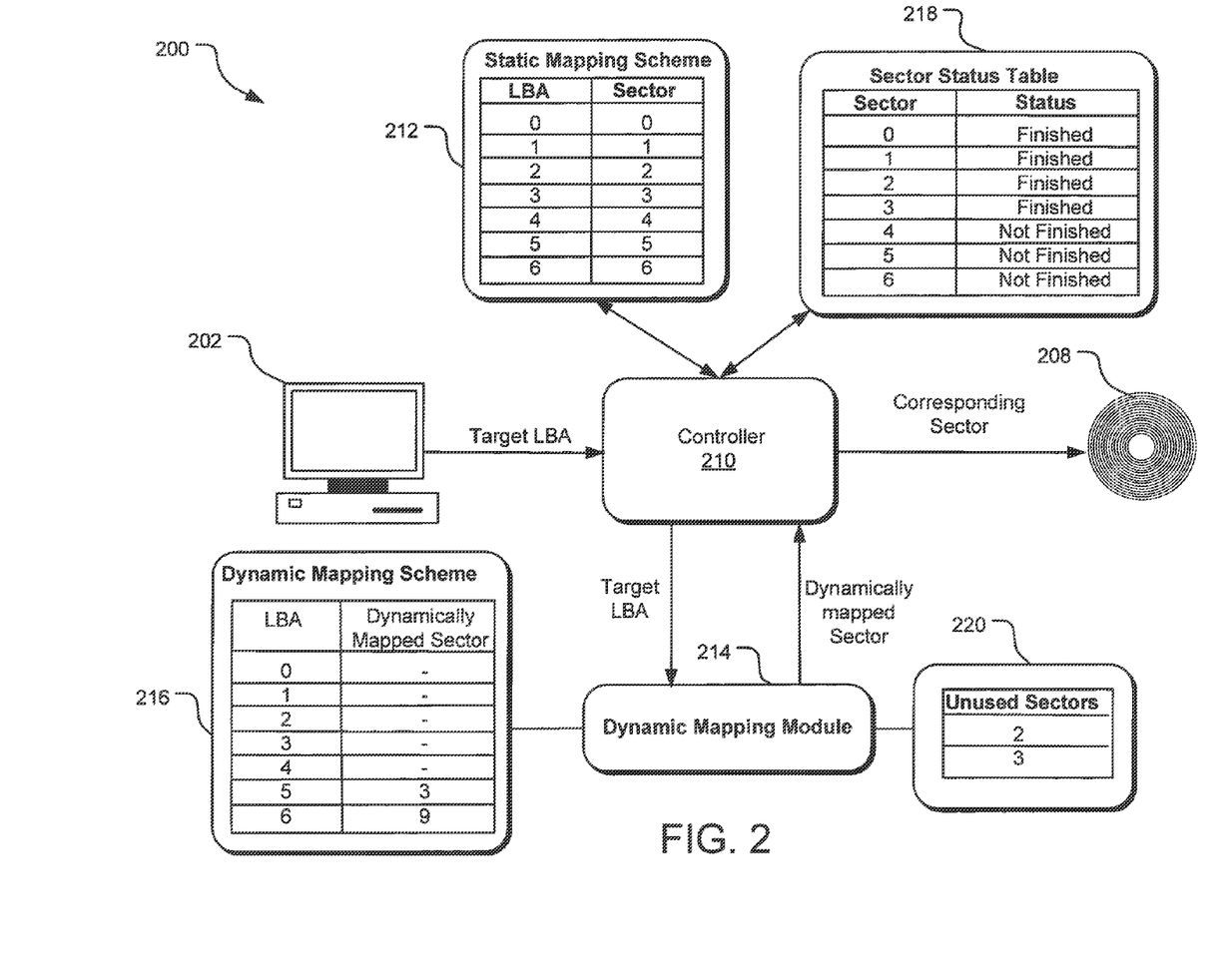
FIG. 2 illustrates another example LBA dynamic mapping system suitable for implementing an in-the-field finishing process.

FIG. 2 illustrates another example dynamic LBA mapping system 200 suitable for implementing an in-the-field finishing process. The system 200 includes a host computer 202 that sends one or more access commands (e.g., read or write commands) to a controller 210, instructing a storage device to write data to a storage medium 208. Each access command includes an associated target LBA. An access command that is a write command also includes data to be written to the storage medium 208.

The controller 210 uses a static mapping scheme 212 to identify a target sector on a medium 208 that corresponds to the target LBA. As used herein, a static mapping scheme is a default logical mapping scheme employed by the storage device that relates a logical address (e.g., an LBA) to one or more corresponding data blocks on the storage medium 208. The static mapping scheme 212 exemplifies one possible static mapping scheme; other static mapping schemes are also contemplated. The static mapping scheme 212 exhibits a one-to-one relationship between each LBA and a corresponding sector number. For example, LBA 0 maps to sector 0; LBA 1 maps to sector 1, and so on. In one implementation, a sector is 512 bytes. Therefore, an LBA of 0 maps to bytes 0-511 (included in sector 0); and an LBA of 1 maps to bytes 512-1023 (included in sector 1). The static mapping scheme 212 may be included in a data record accessible by the storage device or otherwise derivable via logic of the controller 210. An LBA "statically corresponds" to a data block if the LBA maps to the data block under the static mapping scheme.

Using the static mapping scheme 212, the controller 210 determines a target sector number that statically corresponds to the target LBA. For example, the controller 210 may determine that a target LBA of 4 statically corresponds to a target sector number of 4. The controller 210 also determines whether all finishing processes have executed on the target sector, such as by attempting to access (read or write to) the target sector or a data record. As used herein, the term data record refers to a record (e.g., table, logfile, etc.) that may be saved on the storage medium 208 or a storage medium communicatively coupled to the storage device. All data records (e.g., tables) discussed and/or illustrated herein may include information stored in or derivable from one or more individual data records.

In FIG. 2, the controller 210 queries a sector status table 218 (e.g., an example data record) to determine whether the target sector is finished. The sector status table 218 indicates that sectors 0-3 are finished and sectors 4-6 are unfinished. Thus, if the target sector is any of sectors 0-3, the controller 210 may execute the access command on the target sector.

However, if the target sector is an unfinished sector (e.g., sectors 4, 5, or 6) the controller 210 queries a dynamic mapping module 214 to determine whether the target LBA has been remapped to an alternate location on the storage medium 208. The dynamic mapping module 214 may be, for example, a submodule of the controller 210 that is firmware or software, such as firmware embodied within the storage device 206, software of the host computer 202, or firmware or software associated with another processor. The dynamic mapping module 214 accesses and manages a dynamic mapping scheme 216 (e.g., another example data record) that indicates which target LBAs have been dynamically mapped to alternate locations on the storage medium 208. In FIG. 2, the dynamic mapping scheme 216 indicates that the LBA 5 has been dynamically mapped to sector 3 and the LBA 6 has been dynamically mapped to sector 9.

If a received access command includes a target LBA that has already been mapped to an alternate location via the dynamic mapping scheme 216, the dynamic mapping module 214 returns such information to the controller 210, and the controller 210 executes the access command on the dynamically mapped sector (i.e., the sector that corresponds, via the dynamic mapping scheme 216, to the target LBA).

In one example implementation, the controller 210 receives a command from the host 202 to read or write to LBA 5. The controller 210 determines (e.g., by utilizing the static mapping scheme 212) that LBA 5 statically corresponds to sector 5. Further, the controller 210 determines (e.g., by querying the sector status table 218) the LBA 5 is unfinished. The controller 210 queries the dynamic mapping module 214 to determine whether the LBA 5 has previously been mapped via the dynamic mapping scheme 216. In response to such query, the dynamic mapping module 214 retrieves dynamic mapping information and indicates, to the controller 210, that LBA 5 has been dynamically mapped to sector 3. The controller 210 then executes the read or write command on sector 3.

If the dynamic mapping module 214 determines that the target LBA has not yet been remapped via the dynamic mapping scheme 216, the dynamic mapping module 214 attempts to identify an unused sector on the storage medium 208 to which the LBA can be dynamically mapped. For example, the dynamic mapping module 214 may identify an unused sector on the storage medium 208 by accessing an unused sector table 220 (e.g., another example data record) that includes a plurality of unused data sectors on the storage medium 208. After identifying the unused sector, the dynamic mapping module 214 may update the dynamic mapping scheme 216 to indicate that the target LBA has been dynamically mapped to the unused sector.

In another example implementation, the controller 210 receives a command from the host 202 to read or write to LBA 4. The controller 210 determines (e.g., by utilizing the static mapping scheme 212) that LBA 4 statically corresponds to sector 4. Further, the controller 210 determines (e.g., by querying the sector status table 218) the LBA 4 is unfinished. The controller 210 queries the dynamic mapping module 214, and the dynamic mapping module 214 determines that LBA 4 has not yet been dynamically mapped via the dynamic mapping scheme 216. Consequently, the dynamic mapping module 214 accesses the unused sector table 220, identifies sector 2 as an unused sector on the storage medium 208, and updates the dynamic mapping scheme 216 to map LBA 4 to sector 2. The dynamic mapping module 214 then returns "sector 2" to the controller 210, and the controller 210 executes the access command on sector 2.

In the above example, an end user may not receive any indication that the data targeted for LBA 4 in sector 4 was instead written to sector 2. If the host computer sends subsequent access commands to LBA 4, such commands may also be executed on sector 2. However, when sector 4 subsequently becomes available (e.g., when the finishing processes complete on sector 4 or on the entire media 208), the controller 210 or a subroutine of the controller 210 may reverse-map the dynamic mapping scheme to re-implement the static mapping scheme 212. For example, the dynamic mapping module 214 may delete a dynamic mapping entry relating to sector 4 (not shown) in the dynamic mapping scheme 216 and the controller may copy the data in sector 2 to sector 4.

Figure 3:
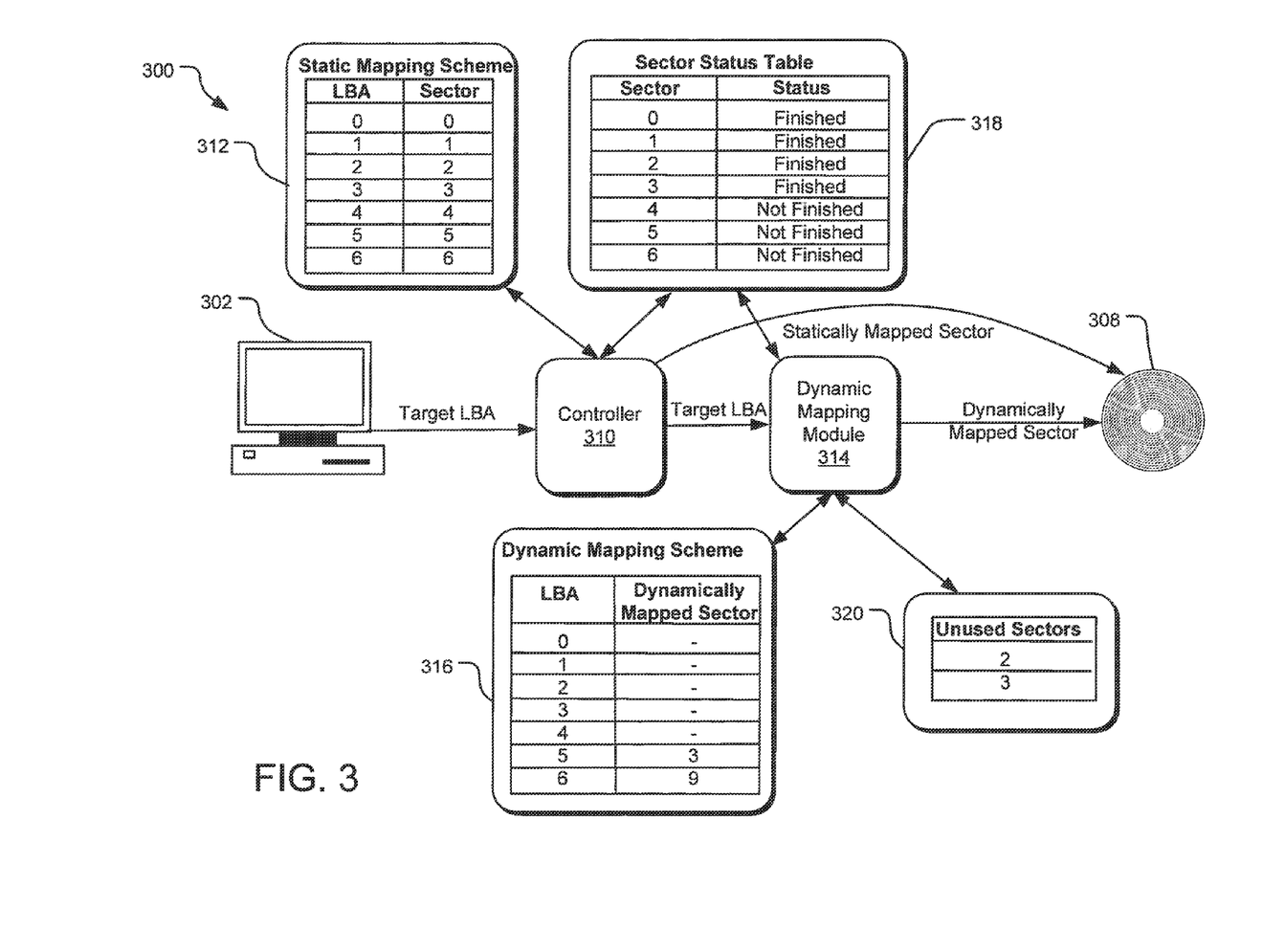
FIG. 3 illustrates another example LBA dynamic mapping system suitable for implementing an in-the-field finishing process.

FIG. 3 illustrates another example LBA dynamic mapping system 300 suitable for implementing an in-the-field finishing process. The system 300 includes a host computer 302 that sends an access command (e.g., a read or write command) to a controller 310 of a storage device (not shown), instructing the storage device to write data to a storage medium 308. Each access command includes a target LBA that corresponds, via a static mapping scheme 312, to a target sector on the storage medium 308. An access command that is a write command also includes data to be written to the target sector.

The controller 310 identifies the target sector (e.g., by utilizing the static mapping scheme 312) and determines whether the target sector is finished. For example, the controller 310 may determine whether the target sector is finished by accessing a sector status table 318 (e.g., an example data record). If the controller 310 determines that the target sector is finished, the controller 310 executes the access command on the statically corresponding sector (i.e., the target sector).

However, if the controller 310 determines that the target sector is not yet finished, a dynamic mapping module 314 is queried to resume handling and execution of the access command. In one implementation, the dynamic mapping module 314 (rather than the controller 310) determines whether the target sector is finished. If the target sector is finished, the dynamic mapping module 314 executes the access command on the statically corresponding sector. If the target sector is not finished, the dynamic mapping module 314 takes additional steps, described below, to handle and execute the access command.

The dynamic mapping module 314 may be, for example, firmware or software embodied within the storage device, the host computer 302, or associated with another processor communicatively coupled to the storage device. The dynamic mapping module 314 creates and manages a dynamic mapping scheme 316 indicating which LBAs have been dynamically mapped to alternate regions on the storage medium 308. In FIG. 3, the dynamic mapping scheme 316 indicates that LBA 5 has been dynamically mapped to sector 3, and LBA 6 has been dynamically mapped to sector 9.

Unlike the dynamic mapping module of FIG. 2, the dynamic mapping module 314 has the ability to directly interface with the storage medium 308 (e.g., read and write to the storage medium 308) without relaying information back to the controller 310. Consequently, the dynamic mapping module 314 can execute access commands on the storage medium 308 without further communication with the controller 310. For example, if an access command is directed to LBA 5, the dynamic mapping module 314 can identify sector 3 as the dynamically mapped sector and execute the access command on sector 3.

If the target LBA of the access command is a LBA that has not yet been dynamically mapped, the dynamic mapping module 314 identifies an unused sector on the storage medium 308 (e.g., by retrieving information from and unused sector table 320) and dynamically maps the target LBA to the unused sector. For example, the dynamic mapping module 314 may determine that LBA 4, which statically corresponds to an unfinished data sector (sector 4), can be dynamically mapped to sector 2. In such case, the dynamic mapping module 314 updates one or more records (e.g., updates the dynamic mapping scheme 316) and executes the access command on the dynamically mapped sector (sector 2). During and after such activity, the controller 310 may have no knowledge of the dynamic mapping scheme 316 and/or access to the one or more records updated by the dynamic mapping module 214.

As each target sector "finishes", reallocated data originally associated (via the static mapping scheme 312) with the target sector can be reverse-mapped and re-written back to the target sector. For example, when the target sector 5 finishes, associated data dynamically mapped (e.g., via the dynamic mapping scheme 316) and written to sector 3 can be rewritten to sector 5. An entry in the dynamic mapping scheme 316 may be updated to indicate that target LBA 5 no longer dynamically maps to sector 3.

In one implementation, the dynamic mapping module 314 performs a re-write of reallocated data immediately upon completion of each newly-finished sector. For example, data originally targeting sector 5 may be rewritten to sector 5 as soon as sector 5 finishes regardless of whether other finishing processes continue to execute on other sectors of the storage medium 308. When such re-write is complete, a data record accessible by the controller 310 (e.g., the sector status table 318) may be updated to indicate that the controller 310 can again read or write to sector 5 via the static mapping scheme 312. When all reallocated data has been re-written to corresponding, original target data blocks according to the static mapping scheme 312, the dynamic mapping module 314 and other associated data records (e.g., the dynamic mapping scheme 316 and the unused sector table 320) can be discarded or erased.

In another implementation, the dynamic mapping module 314 performs a re-write of reallocated data after all finishing processes have fully executed on all useable sectors of the storage medium 308. For example, the dynamic mapping module 314 may, when the last finishing process terminates, begin a batch re-write that moves data from dynamically-mapped sector locations to statically corresponding target sectors on the storage medium 308. When the batch re-write is completed, the controller 310 can stop communicating with the dynamic mapping module 314 and execute all incoming access commands according to the static mapping scheme 312.

In at least one implementation, the system 300 does not determine in real-time whether a target data sector is finished before executing an access command. Rather, the dynamic mapping scheme 316 is a predetermined mapping scheme, such as a scheme created while the storage medium 308 is still at the factory. For example, if a storage medium is going to be sold to a consumer before certain sectors are finished, those unfinished sectors may be dynamically mapped (e.g., in advance of use) to correspond to unused LBA. This original (e.g., at-the-factory) dynamic mapping scheme may be used and remain unaltered until every usable data block on the storage medium 308 is finished. When the entire storage medium 308 is finished, data can be reverse-mapped according to the static mapping scheme, as described above.

Figure 4:
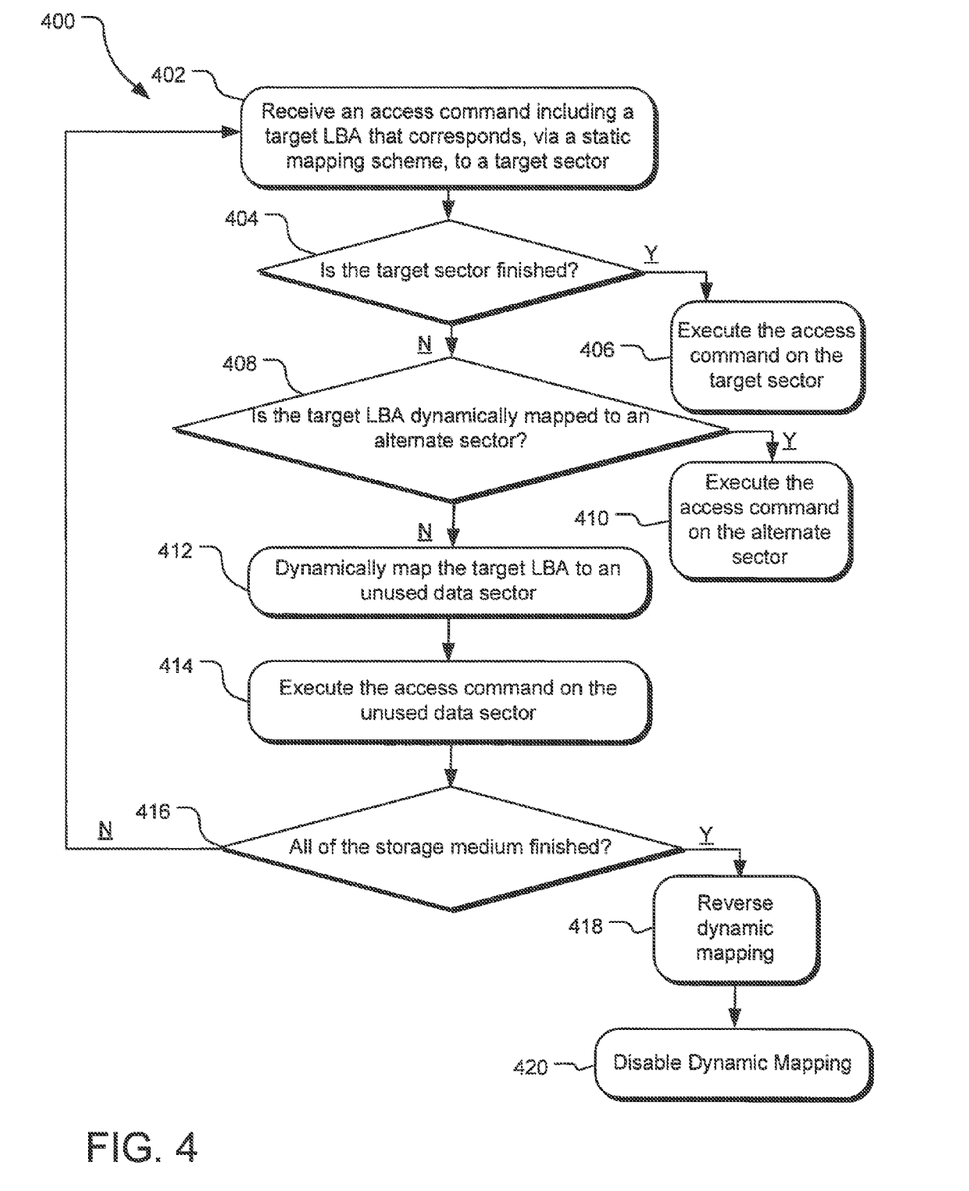
FIG. 4 illustrates example operations for dynamically mapping target LBA to unused data sectors during an in-the-field finishing process.

FIG. 4 illustrates example operations 400 for dynamically mapping target LBA to unused data sectors during an in-the-field finishing process. A receiving operation 402 receives a user-issued access command, such as a write command, that includes an instruction to write data to a target LBA on a storage medium of a storage device. The target LBA may be specified, for example, by a host computer communicatively coupled to the storage device. The target LBA corresponds, via a static mapping scheme, to a target sector on a storage medium.

A determination operation 404 determines whether the target sector is finished. If the target sector is finished, an execution operation 406 executes the access command on the target sector. If the target sector is not yet finished, then a second determination operation 408 determines whether the target LBA has already been dynamically mapped to an alternate sector.

If the target LBA has been dynamically mapped to an alternate sector, another execution operation 410 executes the access command on the alternate sector. However, if the target LBA has not yet been dynamically mapped to an alternate sector, a dynamic mapping operation 412 dynamically maps the target LBA to an unused data sector on the medium. The dynamic mapping operation 412 may include, for example, updating one or more data records on the storage medium or on another storage medium communicatively coupled to the storage device. Responsive to the dynamic mapping operation 412, another execution operation 414 executes the access command on the unused data sector.

After execution of the access command, a third determination operation 416 determines whether all sectors on the storage medium are finished. If all sectors are finished, a reverse mapping operation 418 maps the target LBA back to the target sector and copies data from the unused data sector to the target data sector. In the same or a similar manner, the reverse mapping operation 418 may "reverse-map" and copy all dynamically reallocated data to corresponding original target data blocks on the storage medium according to the static mapping scheme. In at least one implementation, the reverse mapping operation 418 maps data from the dynamically mapped location to an original target sector as soon as the target sector finishes, regardless of whether all sectors on the storage medium are finished.

After the reverse mapping operation 418, a disabling operation 420 disables (such as by setting a flag) the dynamic mapping operation 412 so that all received access commands are executed according to the static mapping scheme.

Figure 5:
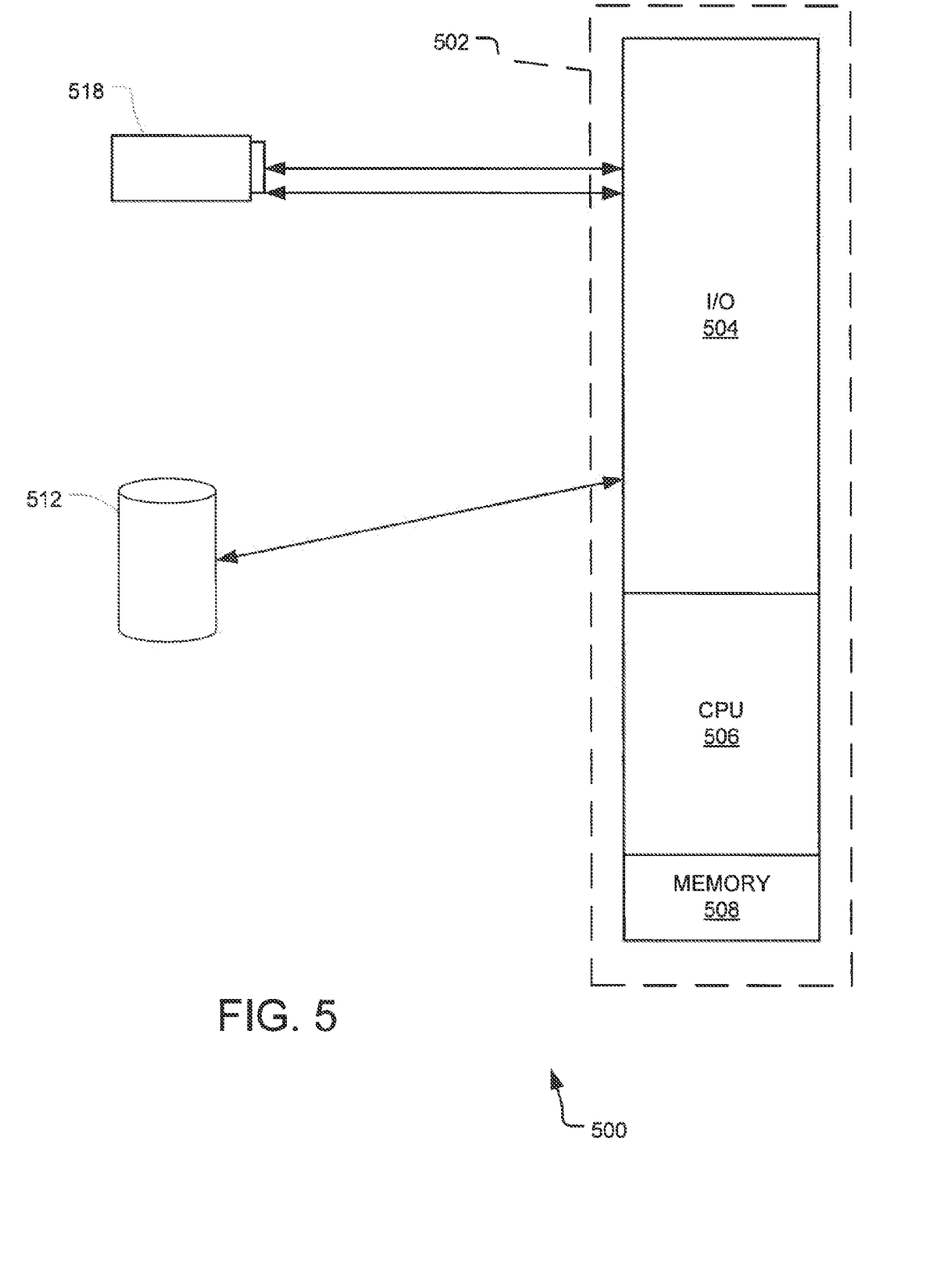
FIG. 5 discloses a block diagram of a computer system suitable for implementing one or more aspects of an in-the-field finishing process.

FIG. 5 discloses a block diagram of a computer system 500 suitable for implementing one or more aspects of an "in-the-field" finishing process. The computer system 500 is capable of executing a computer program product embodied in a tangible computer-readable storage medium to execute a computer process. The tangible computer-readable storage medium is not embodied in a carrier-wave or other signal. Data and program files may be input to the computer system 500, which reads the files and executes the programs therein using one or more processors. Some of the elements of a computer system are shown in FIG. 5, wherein a processor 502 is shown having an input/output (I/O) section 504, a Central Processing Unit (CPU) 506, and a memory section 508. There may be one or more processors 502, such that the processor 502 of the computing system 500 comprises a single central-processing unit 506, or a plurality of processing units. The computing system 500 may be a conventional computer, a distributed computer, or any other type of computer. The described technology is optionally implemented in software loaded in memory 508, a disc storage unit 512, or removable memory 518.

In an example implementation, a dynamic mapping module (the same or similar to the dynamic mapping module described with respect to FIGS. 1-4) may be embodied by instructions stored in memory 508 and/or the storage unit 512 and executed by the processor 502. Further, local computing system, remote data sources and/or services, and other associated logic represent firmware, hardware, and/or software which may be configured dynamically map LBA on a storage device to accommodate an in-the-field finishing process.

The dynamic mapping module may be implemented using a general purpose computer and specialized software (such as a server executing service software), and a special purpose computing system and specialized software (such as a mobile device or network appliance executing service software), or other computing configurations. In addition, program data, such as sector status information (e.g., whether each sector is finished), dynamic mapping records, and other information may be stored in the memory 508 and/or the storage unit 512 and executed by the processor 502.

The implementations of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

What is claimed is:

1. A method comprising:
   receiving an access command to a target logical address corresponding to a target data block on a storage medium; and
   dynamically mapping, with a processor, the target logical address to an unused data block if the access command is received before the target data block is finished.

2. The method of claim 1, wherein the receiving operation occurs during execution of an in-the-field finishing process on the storage medium.

3. The method of claim 1, comprising:
   dynamically mapping the target logical address to the unused data block.

4. The method of claim 1, further comprising:
   moving data from the unused data block to the target data block after the target data block is finished.

5. The method of claim 1, further comprising:
   deleting a record of the dynamic mapping operation after the target data block is finished.

6. The method of claim 1, further comprising:
   receiving a second access command to the target logical address after the target data block is finished; and
   executing the second access command on the target data block.

7. The method of claim 1, further comprising:
   rewriting data reallocated to a plurality of original target data blocks after the storage medium is finished.

8. A system comprising:
   a controller configured to receive an access command from a host, the access command directed to a target logical address corresponding to a target data block on a storage medium; and
   a dynamic mapping module configured to dynamically map the target logical address to an unused data block on the storage medium if the access command is received before the target data block is finished.

9. The system of claim 8, wherein the controller is further configured to execute the access command on the unused data block.

10. The system of claim 8, wherein the dynamic mapping module is configured to execute the access command on the unused data block without communicating information to the controller.

11. The system of claim 8, wherein the access command is received during execution of an in-the-field finishing process of the storage medium.

12. The system of claim 8, wherein the dynamic mapping module is further configured to move data from the unused data block to the target data block after the target data block is finished.

13. The system of claim 12, wherein the dynamic mapping module moves the data without communicating information to the controller.

14. The system of claim 8, wherein the dynamic mapping module is configured to delete a record of the dynamic mapping after the target data block is finished.

15. One or more tangible computer-readable storage media encoding computer-executable instructions for executing on a computer system a computer process, the computer process comprising:
   receiving an access command to a target logical address corresponding to a target data block on a storage medium; and
   dynamically mapping the target logical address to an unused data block if the access command is received before the target data block is finished.

16. The one or more computer-readable storage media of claim 15, wherein the computer process further comprises:
   receiving a second access command including the target logical address after the target data block is finished; and
   executing the second access command on the target data block.

17. The one or more computer-readable storage media of claim 15, wherein the receiving operation occurs during execution of an in-the-field finishing process on the storage medium.

18. The one or more computer-readable storage media of claim 15, further comprising:
   moving data from the unused data block to the target data block after the target data block is finished.

* * * * *